United States Patent [19]

McGonigle

[11] Patent Number: 4,574,174

[45] Date of Patent: Mar. 4, 1986

[54] CONVENIENCE DINNER CONTAINER AND METHOD

[76] Inventor: Thomas P. McGonigle, 2087 Oakdale, Glenside, Pa. 19038

[21] Appl. No.: 612,087

[22] Filed: May 21, 1984

[51] Int. Cl.⁴ .............................................. H05B 6/64
[52] U.S. Cl. ..................... 219/10.55 M; 219/10.55 E; 426/243; 206/541; 206/550; 220/23.83
[58] Field of Search ............. 220/23.8, 23.83; D7/27; 206/541, 550; 426/243; 219/10.55 M, 10.55 E

[56] References Cited

U.S. PATENT DOCUMENTS

| | | | |
|---|---|---|---|
| 3,107,027 | 10/1963 | Hong | 220/23.83 |
| 3,244,537 | 4/1966 | Cease | 220/23.83 |
| 3,247,988 | 4/1966 | Cease | D7/27 |
| 3,305,126 | 2/1967 | Cease | 220/23.83 |
| 6,228,945 | 10/1980 | Wysocki | 220/258 |

Primary Examiner—Joseph Man-Fu Moy
Attorney, Agent, or Firm—Thomas A. Lennox

[57] ABSTRACT

An apparatus and method for supplying, storing and cooking a dinner in a microwave oven including assembling the meal in upside-down fashion in a compartmentalized lid, equipped with vent holes sealed with adhesive tape to prevent escape of the food with a foil covering over the lid to protect the frozen meal during the storage which when the meal is ready to be cooked, the lid is inverted over a reusable microwavable dish with such that the food drops into the dish, the sealing tape is removed from the vents and the unit placed in a microwave oven.

2 Claims, 6 Drawing Figures

CONVENIENCE DINNER CONTAINER AND METHOD

BACKGROUND OF THE INVENTION

This invention relates to the containers and method of supplying food for microwave or conventional cooking. In particular, in relates to the packaging of food in containers and allowing transfer of the food to containers capable of sustained cooking in contact with the food.

One of the prime advantages of microwave cooking is the quick preparation of meals for a small family. In this day when the entire family is either at school or at work, pre-prepared frozen convenience dinners or meals continue in popularity. If the frozen meal is packed in aluminum foil containers, it may be cooked in a regular oven, but the metal container can not be used in microwave ovens. Certain types of plastic, ceramic and glass are suitable for microwave use. The common plastics of a cost suitable for packaging frozen pre-prepared dinners are not recommended for microwave use. If the common plastic such as polystyrene, polyvinyl chloride or polyolefins are used in microwave cooking in direct contact with food for any significant period of time, they will degrade, crack or contaminate the food. On the other hand, the special plastics suitable for microwave cooking food on a continuous basis are too expensive to discard after one use. The term "microwavable", when modifying a material, is used to denote the type of material that can be safely used in a microwave oven, such as plastic polymers. When the term "microwavable" is used to denote the type of container then that container can be safely and continuously used in microwave cooking in direct contact with the food. The microwavable container may also be used in a conventional oven. Such microwavable polymeric plastic containers are provided for special gourmet frozen meals, but the dish adds a substantial cost to the meal. There is a need for an apparatus and method to provide inexpensive frozen meals in containers that may be cooked in either microwave or conventional ovens.

An aluminum T.V. dinner tray and transparent cover is illustrated in Defensive Publication No. 617,877 by Gordon H. Lawry. U.S. Patents describing various containers for cooking and storing foods include U.S. Pat. No. 2,495,435 to Arthur E. Welsh, U.S. Pat. No. 3,188,215 to William T. Snow, Jr., U.S. Pat. No. 3,672,916 to Herbert J. Virnig, U.S. Pat. No. 3,830,944 to G. Dimitriadis, U.S. Pat. No. 4,015,085 to Francis J. Woods, U.S. Pat. No. 4,141,487 to Clifford C. Faust et al, U.S. Pat. No. 4,210,674 to Richard P. Mitchell, U.S. Pat. No. 4,328,254 to Peter Waldburger and U.S. Pat. No. 4,419,373 to Walter J. Oppermann.

None of the present containers and systems satisfy the above needs nor attain the objects described hereinafter.

SUMMARY OF THE INVENTION

It is an object of this invention to provide container devices and a method to allow the storage of meals ready to be reconstituted in either a microwave or conventional oven without supplying expensive cooking dishes but yet ready to be individually cooked with separation of the meal components.

It is a particular object of this invention to allow reuse of expensive cooking and serving plates presently provided by manufacturers of microwavable convenience type meals.

It is a further object of this invention to provide storage containers which will interfit over previously supplied reusable microwavable dishes.

It is an additional object of this invention to provide an assembled meal in a storage container that is both inexpensive but completely suitable to protect the food during storage and have a added use as a cover during the microwave cooking process.

It is an additional object of this invention to allow use of plastics which are suitable for storage of food to display convenience type meals ready for microwave cooking and avoid the necessity of providing expensive microwavable containers with each sale.

It is a further object of this invention to provide a vented cover to be used during microwave cooking to enhance the quality of the meal and at the same time be the substantial portion of the container used for storage.

It is a particular object of this invention to permit frequent reuse of microwavable dishes which may be originally supplied with a pre-prepared frozen convenience type meal to reduce the loss of material and expense.

It is an additional object of this invention to provide a container and method which allow the food to be cooked either in a microwave or a conventional oven.

This invention is for use with microwavable cooking and serving dish. This dish has at least one and preferably, a plurality of concave compartments such that various portions of a meal may be separated during cooking and eating. The invention includes a lid having at least one complimentary concave compartment and preferably a plurality of compartments constructed such that the lid aligns with and engages over the dish so that complimentary compartments in each are juxtaposed above and below each other. The lid is constructed of a microwavable material of a thickness suitable for disposal after one use and has at least one vent hole in a concave compartment and preferably at least one vent hole in each compartment with a vent sealing device over each vent hole to seal the hole from allowing food resting on the hole to escape or be exposed to the elements. The vent sealing device, preferably an adhesive film covering, is removable when the lid is inverted and placed over the dish. A cover device, preferably a metal foil, is included to cover the compartments of the lid and seal the foods stored and frozen in each compartment during storage, wherein the cover device is removable to expose the food before cooking. This cover device is preferably a metal foil crimped over and around the periphery of the lid. When the lid is engaged over the dish, food in each compartment of the lid is caused to drop downwardly into the complimentary compartment of the dish. With the lid in place covering the food and the vent holes exposed, the meal is cooked in a microwave oven. If conventional cooking is chosen the lid is removed, the metal foil is place over the dish, and the food cooked in an oven.

A method of this invention for providing, storing and cooking a dinner either in a microwave oven or a conventional oven includes assembling a meal for microwave or heat constitution in an upside down fashion in a lid having at least one compartment and preferably multiple compartments separating each type of food. The method includes installing in the lid at least one vent hole in the compartment and preferably one vent hole in each compartment generally located under the components of the meal and covering each vent hole with an adhesive sealing device which prevents the meal from escaping through the hole and protects it from the elements during storage. This adhesive sealing device is later removed from the outside surface, which is the bottom of the lid when being used in its storage capacity. The method includes covering and sealing each open compartment, with a foil sealing device to protect the meal during storage. When the meal is ready to be cooked after being stored under conditions to protect the freshness of the meal, the foil is removed to expose the meal. The lid is then inverted over a dish, the dish being of a size such that the lid interfits over the vertical sides of the dish, the dish having a complimentary compartment for each compartment of the lid and the dish further being of a construction and the material suitable for continuous and multiple use in microwave cooking. While the cover is over the dish, the adhesive sealing device is removed to expose the vent holes. The meal is caused to drop from the lid into the dish, generally by flexing the lid and improved by first removing the adhesive sealing device. The meal is cooked in a microwave oven with the lid in place or is cooked in a conventional oven with the lid removed and the foil covering the food.

DESCRIPTION OF PREFERRED EMBODIMENTS

Figure 1:
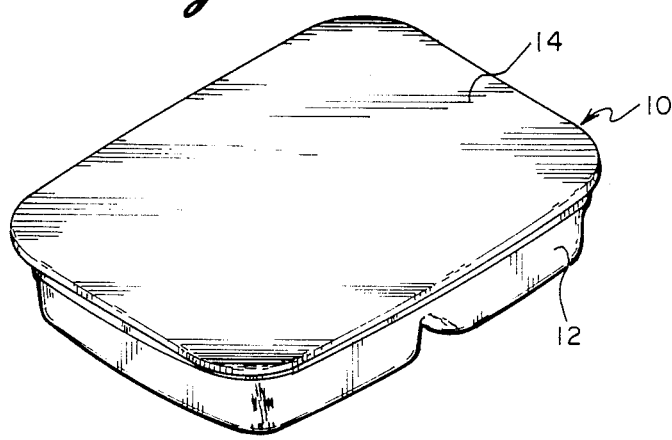
FIG. 1 is a perspective view of a lid of the present invention with foil cover in place for storage.
Figure 2:
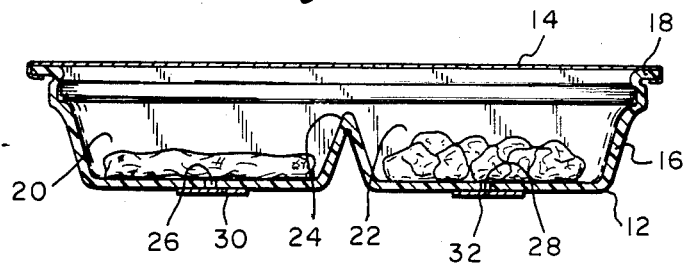
FIG. 2 is a vertical cross sectional view of the lid and foil cover of FIG. 1 showing the meal in place during storage.

In FIG. 1 packaging and storage container 10 is shown with two compartments with aluminum foil 14 forming an enclosed package. The cross sectional view of FIG. 2 shows foil 14 crimped sealed around sides 16 to outstanding lip 18 of lid 12. Lid 12 is formed to provide two concave compartments 20 and 22 separated by partition 24. Each compartment is equipped with vent holes 26 and 28 covered by adhesive plastic film coverings 30 and 32. Food is pictured in each compartment placed there in an upside down fashion. For example, sauces or decoration intended to be on the top when the food is served are placed on the bottom under the food during storage. Lid 12 is constructed of a thin plastic suitable for storage and protection of the food during freezing and suitable for microwave cooking, but not necessarily in direct contact with the food nor in holding the food during cooking. Foil 14 is of aluminum foil suitable for high conventional oven use if it is used to cover the food during cooking.

Figure 3:
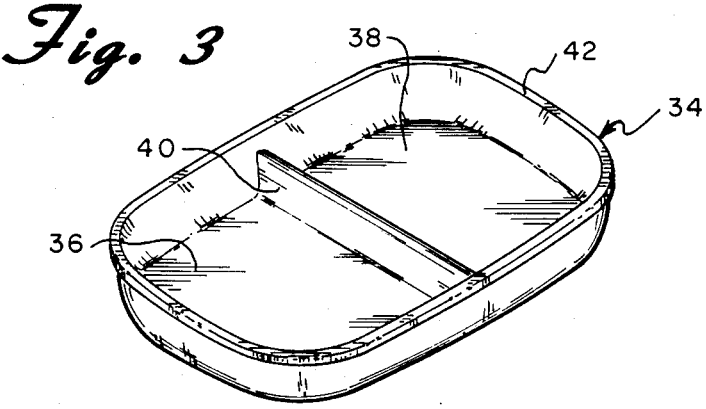
FIG. 3 is a perspective view of a reusable microwavable dish used with of the present invention.
Figure 4:
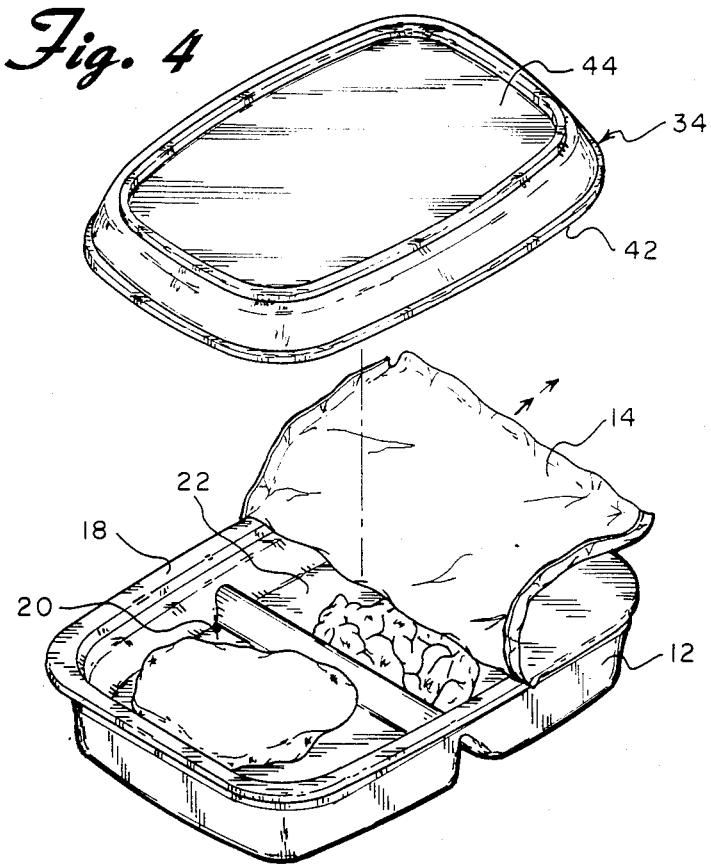
FIG. 4 is a perspective view of the lid and cover of FIG. 1 with the cover being removed and the dish of FIG. 3 being placed over the food.
Figure 5:
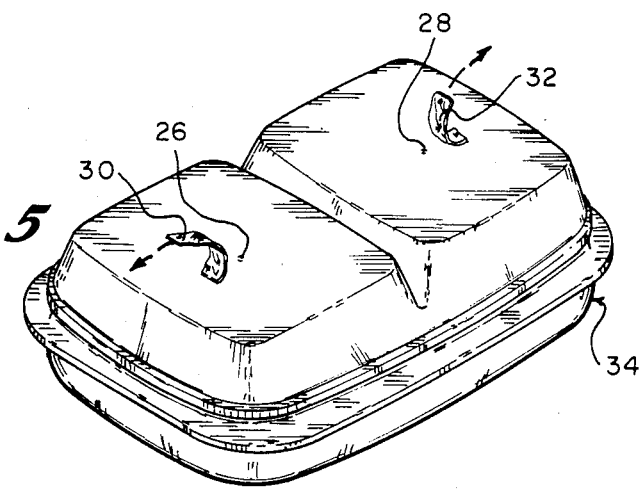
FIG. 5 is a perspective view showing the lid and the dish, now inverted, ready for cooking.
Figure 6:
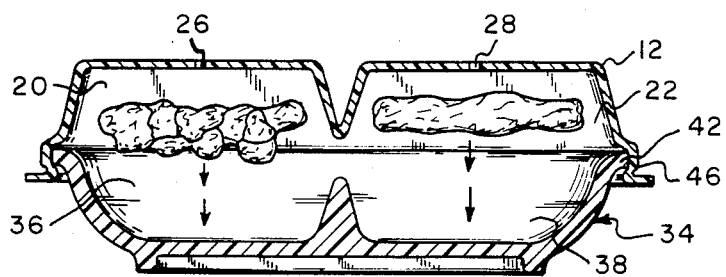
FIG. 6 is a vertical cross sectional view illustrating the interior of the lid and dish combination of FIG. 5.

In FIG. 3 dish 34 is shown constructed of thermoset plastic suitable for microwave cooking on a continuous and reuse basis. Dish 34 is constructed with two compartments, 36 and 38, separated by partition 40. Periphery edge lip 42 is designed to infit with lid 12 so that the lid stays in position during the cooking process. In FIG. 4, dish 34 is inverted so that bottom 44 is temporarily up. Dish 34 is placed on lid 12 to rest on and interfit over lid 18 after foil 14 is removed and set aside. Foil 14 may be used if a conventional oven is be employed in the cooking process since the metal foil will not degrade during the heat. In this fashion, compartment 36 is positioned directly over compartment 20 and compartment 38 is positioned directly over 22. As pictured in FIG. 5, the entire combination is inverted. Adhesive tabs 30 and 32 are removed to expose vent holes 26 and 28. To facilitate the food dropping from lid 12 into dish 34, lid 12 may be flexed and any remaining food will drop down during the cooking process. A basting mixture may be chosen and adhered to the lid top so that it will drop onto the food during the cooking process. The cross sectional view of FIG. 6 illustrates how the food drops from the compartments of lid 12 into the complimentary compartments of dish 34. Indent shape 46 of lid 12 interfits over and snaps over lip 42 of dish 34 to hold lid 12 in place during the cooking process.

If cooking in a standard oven is preferred lid 12 may be removed after the food is dislodged and rests in dish 34. Foil 14 may be used to cover the food during the cooking operation to help prevent loss of moisture.

It is preferred that there be at least one vent hole in each compartment of the lid. It is also preferred that the dish include vertical sides around the periphery with a outstanding horizontal lip over which a detent of the lid may snap over to hold the lid in place during the cooking process. While the invention includes the lid for storage together with a cover to protect the food, it is preferred that the invention include a cooking and serving dish supplied by the supplier of the food in the lid, even if the dish is supplied separately from the food in the lid.

While this invention has been described with reference to the specific embodiments disclosed herein, it is not confined to the details set forth and the patent is intended to include modifications and changes which may come within and extend from the following claims.

I claim:

1. A method for providing, storing, and cooking a convenience meal in a either microwave oven or a convectional oven comprising:
    (a) assembling a meal for microwave or heat reconstitution in an upside down fashion in a lid having at least one compartment,
    (b) installing in the lid as least one vent hole in the compartment located generally under the meal,
    (c) covering each vent hole with an adhesive sealing means which prevents the meal from escape and contact with the elements,
    (d) covering and sealing each open compartment of the lid with a foil sealing means to protect the meal,
    (e) storing the lid with the meal sealed inside, under conditions to protect the freshness of the meal until use,
    (f) removing the foil to expose the meal,
    (g) inverting the lid over a dish of a size such that the lid interfits over the sides of the dish, the dish having a complimentary compartment for each compartment of the lid, wherein the dish is microwavable and of a construction and material suitable for reuse,
    (h) removing the adhesive sealing means to expose each vent hole,
    (i) causing the meal in the lid to drop into the dish, and
    (j) cooking the meal.

2. The method of claim 1 wherein the lid is left interfitted over the dish and the meal is cooked in a microwave oven.

* * * * *